US007933372B2

(12) United States Patent
Oteri et al.

(10) Patent No.: US 7,933,372 B2

(45) Date of Patent: Apr. 26, 2011

(54) SUCCESSIVE INTERFERENCE CANCELLATION BASED ON THE NUMBER OF RETRANSMISSIONS

(75) Inventors: Oghenekome F. Oteri, Austin, TX (US); Leo G. Dehner, Austin, TX (US); Jayesh H. Kotecha, Austin, TX (US); Raja V. Tamma, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 1003 days.

(21) Appl. No.: 11/683,630

(22) Filed: Mar. 8, 2007

(65) Prior Publication Data

US 2008/0219388 A1 Sep. 11, 2008

(51) Int. Cl.

| | |
|---|---|
| ***H03D 1/04*** | (2006.01) |
| ***H03D 1/06*** | (2006.01) |
| ***H03K 5/01*** | (2006.01) |
| ***H03K 6/04*** | (2006.01) |
| ***H04B 1/10*** | (2006.01) |
| ***H04L 1/00*** | (2006.01) |
| ***H04L 25/08*** | (2006.01) |
| *H04B 15/00* | (2006.01) |

(52) U.S. Cl. ......................... 375/349; 375/346; 375/285

(58) Field of Classification Search .................. 375/232, 375/346, 349, 285

See application file for complete search history.

(56) References Cited

U.S. PATENT DOCUMENTS 5,946,355 A * 8/1999 Baker .......................... 375/286
6,463,103 B1 * 10/2002 Dong et al. ................... 375/242
7,016,658 B2 3/2006 Kim et al.
7,298,717 B2 * 11/2007 Hui et al. ...................... 370/329
7,480,516 B1 * 1/2009 Chen et al. .................... 455/522
7,580,427 B2 * 8/2009 Yun et al. ...................... 370/477
2001/0053143 A1 12/2001 Li et al.
2002/0176362 A1 * 11/2002 Yun et al. ...................... 370/236
2003/0016759 A1 * 1/2003 Hottinen et al. ............. 375/267
2003/0018475 A1 * 1/2003 Basu et al. .................... 704/270
2003/0066004 A1 4/2003 Rodrapatna et al.
2003/0076908 A1 4/2003 Huang et al.
2003/0081690 A1 * 5/2003 Kim et al. ..................... 375/264
2003/0106008 A1 * 6/2003 Butler et al. .................. 714/752
2003/0156572 A1 * 8/2003 Hui et al. ...................... 370/349
2004/0181618 A1 * 9/2004 Dottling et al. ................ 710/33
2004/0196780 A1 * 10/2004 Chin et al. .................... 370/208

(Continued)

FOREIGN PATENT DOCUMENTS

EP 1298829 A1 2/2003

(Continued)

OTHER PUBLICATIONS

Alexander Boronka, Daniel Efinger and Joachim Speidel, "Improving MIMO Detection by L-Value Analysis and Adaptive Threshold-Based Cancellation," IEEE 2003, pp. 2099-2103.

(Continued)

*Primary Examiner* — David C Payne
*Assistant Examiner* — Erin M File

(57) ABSTRACT

A method for processing a plurality of symbol streams is provided. The method includes receiving a first symbol stream, wherein the first symbol stream has a corresponding first number of retransmissions. The method further includes receiving a second symbol stream, wherein the second symbol stream has a corresponding second number of retransmissions. The method further includes selecting the first symbol stream for decoding, if the first number of retransmissions is greater than the second number of retransmissions.

22 Claims, 2 Drawing Sheets

U.S. PATENT DOCUMENTS

| | | | | |
|---|---|---|---|---|
| 2004/0213184 | A1 | 10/2004 | Hu et al. | |
| 2005/0058154 | A1 * | 3/2005 | Lee et al. | 370/473 |
| 2005/0063378 | A1 | 3/2005 | Kadous | |
| 2005/0117520 | A1 | 6/2005 | Miyoshi | |
| 2005/0157883 | A1 * | 7/2005 | Herre et al. | 381/17 |
| 2005/0245197 | A1 * | 11/2005 | Kadous et al. | 455/67.13 |
| 2006/0159079 | A1 * | 7/2006 | Sachs et al. | 370/389 |
| 2006/0179390 | A1 * | 8/2006 | Tirkkonen et al. | 714/748 |
| 2006/0193391 | A1 * | 8/2006 | Borran et al. | 375/260 |
| 2007/0014359 | A1 * | 1/2007 | Gomila et al. | 375/240.16 |
| 2007/0115864 | A1 * | 5/2007 | Bar-Ness et al. | 370/278 |
| 2008/0063050 | A1 * | 3/2008 | Kadono | 375/240.01 |
| 2008/0144708 | A1 * | 6/2008 | Tsuie et al. | 375/227 |
| 2008/0192854 | A1 * | 8/2008 | Kim et al. | 375/267 |

FOREIGN PATENT DOCUMENTS

| | | | |
|---|---|---|---|
| EP | 1615365 | A1 | 11/2006 |
| JP | 2006229588 | A | 8/2006 |
| JP | 2006238215 | A | 9/2006 |

OTHER PUBLICATIONS

Haitao Zheng, Angel Lozano, Mohamed Haleem, “Multiple ARQ Processes For MIMO Systems,” IEEE 2002, pp. 1023-1026.

International Search Report and Written Opinion for correlating PCT Patent Application No. PCT/US2008/053632 dated Jul. 1, 2008.

* cited by examiner

SUCCESSIVE INTERFERENCE CANCELLATION BASED ON THE NUMBER OF RETRANSMISSIONS

BACKGROUND

1. Field

This disclosure relates generally to communication methods and systems, and more particularly to interference cancellation based on the number of retransmissions.

2. Related Art

In successive interference cancellation techniques, the symbol streams are not detected in parallel but one after another. As already detected symbols influence the detection of succeeding symbols, error propagation problems arise. For example, in a MIMO system, if a previous decoded layer is in error then the next decoded layer will most likely also be in error. Error propagation problems can reduce the efficacy of successive interference cancellation techniques.

Accordingly, there is a need for methods and systems that address the error propagation problem, including interference cancellation based on the number of retransmissions.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
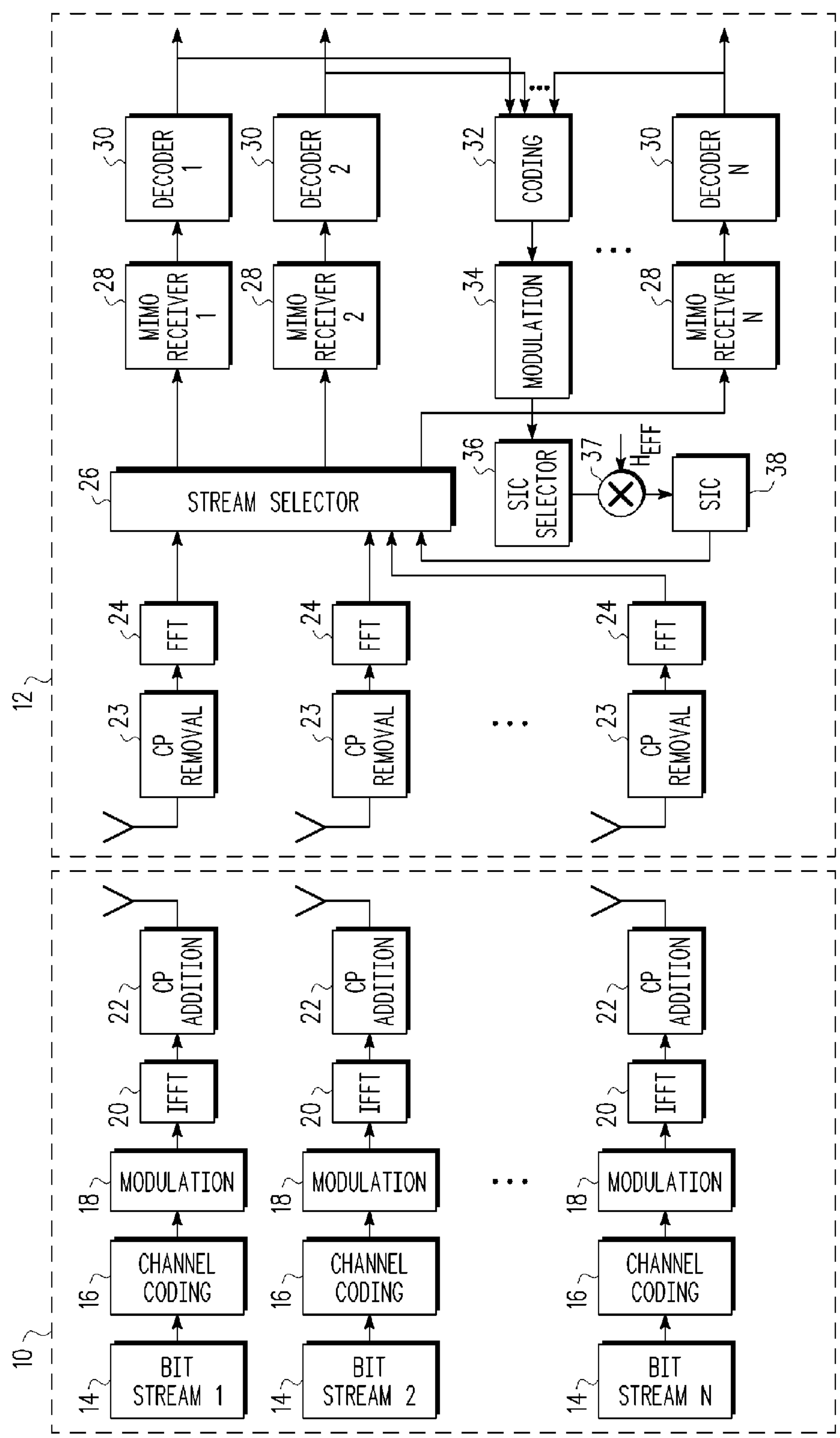
FIG. 1 is an exemplary block diagram of a transmitter and a receiver.

In general, methods related to a Multiple Input Multiple Output (MIMO) system are provided. As part of the MIMO system multiple symbol streams are transmitted and received giving rise to interference among the symbol streams at the receiver. To reduce the interference among the symbol streams, the received symbol streams are successively decoded and canceled. Successive interference cancellation results in error propagation. To reduce error propagation, information, such as the number of retransmissions of a symbol stream and the reliability of its decoding are incorporated into the successive interference cancellation process at the receiver.

In one aspect, a method for processing a plurality of symbol streams is provided. The method may include receiving a first symbol stream, wherein the first symbol stream has a corresponding first number of retransmissions. The method may further include receiving a second symbol stream, wherein the second symbol stream has a corresponding second number of retransmissions. The method may further include selecting the first symbol stream for decoding, if the first number of retransmissions is greater than the second number of retransmissions.

In another aspect, a method for processing a plurality of symbol streams is provided. The method may include receiving a first symbol stream, wherein the first symbol stream has a corresponding first number of retransmissions. The method may further include receiving a second symbol stream, wherein the second symbol stream has a corresponding second number of retransmissions. The method may further include the first symbol stream and the second symbol stream having a corresponding decoding order related to a previous transmission and wherein if the first number of retransmissions is equal to the second number of retransmissions, the method includes selecting the first symbol stream or the second symbol stream for decoding based on the decoding order.

In yet another aspect, a method for processing a plurality of symbol streams is provided. The method may include receiving a first symbol stream, wherein the first symbol stream has a corresponding first number of retransmissions. The method may further include receiving a second symbol stream, wherein the second symbol stream has a corresponding second number of retransmissions. The method may further include selecting the first symbol stream for decoding, if the first number of retransmissions is greater than the second number of retransmissions, and wherein if the first number of retransmissions is equal to the second number of retransmissions, selecting the first symbol stream for decoding, if a channel energy of the first symbol stream is greater than a channel energy of the second symbol stream. In one embodiment, the term channel energy may mean an effective channel gain.

In still another aspect, a method for processing a plurality of symbol streams is provided. The method may include receiving a first symbol stream, wherein the first symbol stream has a corresponding first number of retransmissions. The method may further include receiving a second symbol stream, wherein the second symbol stream has a corresponding second number of retransmissions. The method may further include selecting the first symbol stream for decoding, if the first number of retransmissions is greater than the second number of retransmissions, and wherein if the first number of retransmissions is equal to the second number of retransmissions, selecting the first symbol stream for decoding, if a signal to interference ratio of the first symbol stream is greater than a signal to interference ratio of the second symbol stream.

FIG. 1 is an exemplary block diagram of a transmitter 10 and a receiver 12. Transmitter 10 and receiver 12 may communicate via a channel. Transmitter 10 may process several bit streams and transmit each of the bit streams using antennas. By way of example, transmitter 10 may process bit streams 1, 2, and N 14. Each bit stream may be processed using a channel coding block 16, a modulation block 18, an IFFT block 20, and a CP addition block 22. Receiver 12 may receive symbol streams via antennas and process them. Each symbol stream may be processed by a cyclic prefix (CP) removal block 23, a FFT block 24 and a stream selector 26. The output of stream selector may be coupled to MIMO receiver 1, 2, and N 28. Received symbol streams may be decoded using decoder 1, 2, and N 30. The outputs of decoders 1, 2, and N-1 (decoder N-1 not shown) may be coupled to a coding block 32 and a modulation block 34. The output of modulation block 34 may be coupled to a successive interference cancellation (SIC) selector block 36. SIC selector block 36 determines whether to perform successive interference cancellation or not. SIC block 38 may perform successive interference cancellation using the decoded symbol stream(s) (received via blocks 32 and 34) if the decoded symbol stream (s) meets a predetermined condition, a given metric, or a confidence level as determined by SIC selector block 36. The output of SIC selector block 36 may be coupled to a multiplier block 37, which may be used to multiply the output of selector block 36 with the effective channel ($H_{EFF}$), assuming all the canceled symbol streams have been removed. The output of multiplier block 37 may be coupled to a successive interference cancellation (SIC) block 38, which may be used to perform successive interference cancellation. The output of SIC block 38 may be coupled to an input of stream selector 26. Although FIG. 1 shows a specific arrangement of components as part of transmitter 10 and receiver 12, these components may be arranged differently and there may be more or fewer components. For example, although FIG. 1 shows blocks 20, 22, 23, and 24, they may not be necessary for operation of the disclosed embodiments.

Figure 2:
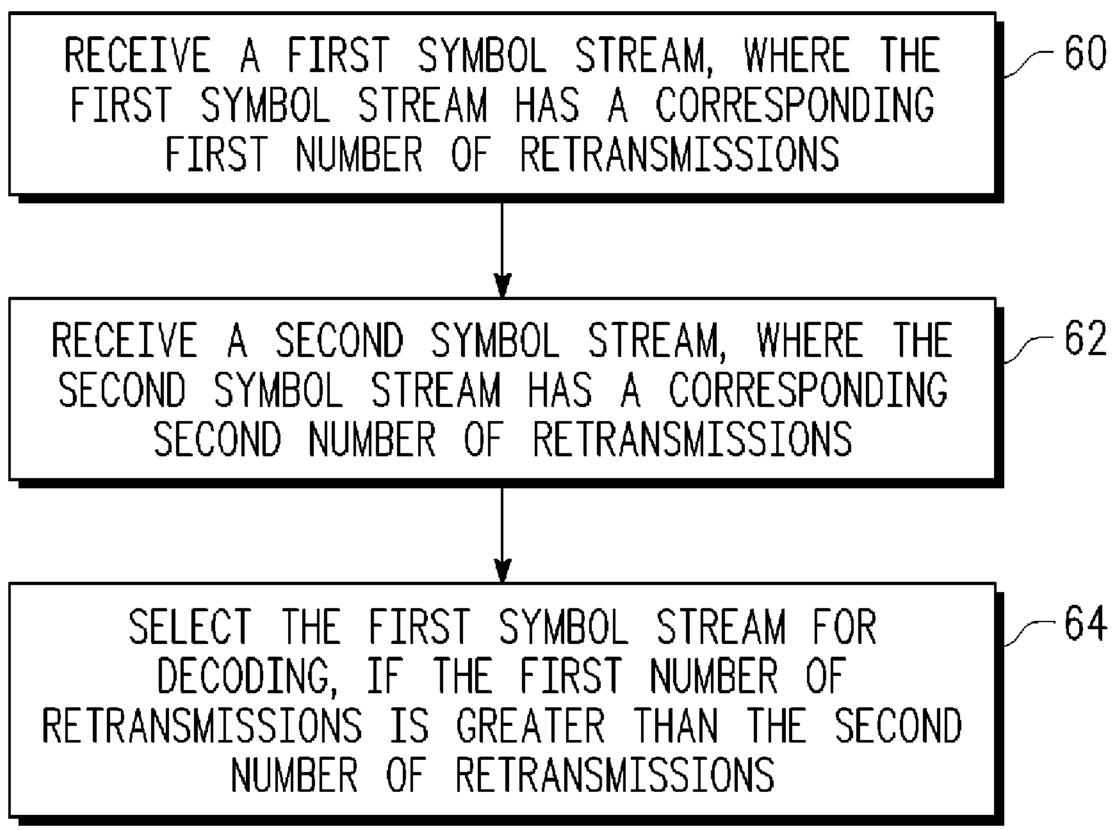
FIG. 2 is a flow chart for an exemplary method for processing symbol streams using the receiver of FIG. 1.

FIG. 2 is a flow chart for an exemplary method for processing symbol streams using the receiver of FIG. 1. The exemplary method may include receiving a first symbol stream, wherein the first symbol stream has a corresponding first number of retransmissions (step 60). The first symbol stream may be received by Multiple Input Multiple Output (MIMO) receiver 1 (reference numeral 28) of FIG. 1, for example. By way of example, the first number of retransmissions may relate to the number of hybrid automatic repeat requests (H-ARQ). Alternatively, the number of retransmissions may be derived from other information. For example, the number of retransmissions may be based on the number of codewords (possibly different) derived from the same information and sent in parallel using different antennas. The method may further include receiving a second symbol stream, wherein the second symbol stream has a corresponding second number of retransmissions (step 62). The second symbol stream may be received by MIMO receiver 2 (reference numeral 28) of FIG. 1, for example. By way of example, the second number of retransmissions may relate to the number of H-ARQs. Alternatively, the number of retransmissions may be derived from other information. For example, the number of retransmissions may be based on the number of codewords derived from the same information and sent in parallel using different antennas. The exemplary method may further include selecting the first symbol stream for decoding, if the first number of retransmissions is greater than the second number of retransmissions (step 64). By way of example, stream selector 26 of FIG. 1 may perform this step. Thus, for example, if the first number of retransmissions is four and the second number of retransmissions is three, then the first symbol stream may be selected for decoding by stream selector 26. The symbol stream with higher number of retransmissions is used because the symbol stream with the higher number of retransmissions is statistically more reliable.

Stream selector 26 may also maintain a decoding order for the received symbol streams. Decoding order may relate to the order in which the received symbol streams are decoded, for example. In case where the first retransmission number and the second retransmission number are the same, i.e., the two symbol streams have been retransmitted the same number of times, then in one embodiment, the decoding order of the two symbol streams from a previous transmission may be used to determine which symbol stream is selected for interference cancellation. As part of this step, the symbol stream that was decoded first may be used for interference cancellation. This is because the symbol stream that is decoded second will have additional errors, including the error from the symbol stream that was decoded first.

In case where the first symbol stream and the second symbol stream are transmitted for the first time, i.e., no retransmission information exists for the two symbol streams, then the symbol stream with a higher signal to interference ratio may be selected for interference cancellation. Other metrics associated with the symbol streams may also be used to determine which one of the symbol streams is selected for interference cancellation. For example, channel energy associated with the symbols streams may be used to determine which one of the symbol streams is used for interference cancellation. Thus, if the first symbol stream has higher channel energy than the second symbol stream, then the first symbol stream may be used for interference cancellation.

Once a symbol stream is decoded, it may still be not used for interference cancellation. By way of example, as shown in FIG. 3, the selected symbol stream may be decoded and used for interference cancellation if the decoded symbol stream meets a predetermined condition. By way of example, the predetermined condition may be related to whether the decoded symbol stream has no error. For example, if a cyclic redundancy check associated with the decoded symbol stream indicates no error then the decoded symbol stream may be used for interference cancellation. Alternatively, a confidence level relating to each decoded stream may be determined and if the confidence level meets or exceeds a predetermined level, then the decoded symbol stream may be used for interference cancellation. The predetermined confidence level may relate to an average of log likelihood ratios (LLRs) or a probability of error for the decoded symbol stream. In case, a first decoded symbol stream has an error and a second decoded symbol stream exceeds a predetermined confidence level, then the second decoded symbol stream may be removed and the first stream may be decoded again. This way the effect of the second decoded symbol stream may be removed during decoding of the first symbol stream. This process may be repeated, as needed.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. For example, the methods described herein may be implemented by various means. For example, these techniques may be implemented in hardware, firmware, software, or a combination thereof. Hardware implementations may include application specific integrated circuits (ASICs), digital signal processors (DSPs), programmable logic devices (PLDs), field programmable gate arrays (FPGAs), processors, controllers, micro-controllers, microprocessors, electronic devices, other electronic units designed to perform the functions described herein, or a combination thereof. A firmware and/or software implementation may include instructions (e.g., procedures, functions, and so on) that may be utilized to perform the functions described herein. The instructions, e.g., as software or firmware, may be stored in a memory and executed by a processor. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for processing a plurality of symbol streams, the method comprising:

receiving a first symbol stream, wherein the first symbol stream has a corresponding first number of retransmissions;

receiving a second symbol stream, wherein the second symbol stream has a corresponding second number of retransmissions;

selecting the first symbol stream for decoding, if the first number of retransmissions is greater than the second number of retransmissions; and selecting the first symbol stream or the second symbol stream based on the decoding order relative to a previous transmission, if the first number of retransmissions is equal to the second number of retransmissions, wherein the first symbol stream and the second symbol stream have a corresponding decoding order relative to the previous transmission.

2. The method of claim 1, wherein if the first symbol stream and the second symbol stream are transmitted for the first time, the method further comprising:

selecting the first symbol stream for decoding, if a signal to interference ratio of the first symbol stream is greater than a signal to interference ratio of the second symbol stream.

3. The method of claim 1, wherein if the first symbol stream and the second symbol stream are transmitted for the first time, the method further comprising:

selecting the first symbol stream for decoding, if a channel energy of the first symbol stream is greater than a channel energy of the second symbol stream.

4. The method of claim 1 further comprising decoding the selected symbol stream and using the selected symbol stream for interference cancellation, if the decoded symbol stream meets a predetermined condition.

5. The method of claim 4, wherein the predetermined condition relates to whether the decoded symbol stream has no error.

6. The method of claim 4, wherein the predetermined condition relates to whether the decoded symbol stream has a predetermined confidence level.

7. The method of claim 6, wherein the predetermined confidence level relates to an average of the log likelihood ratios of the decoded symbol stream.

8. The method of claim 1, wherein if the first symbol stream and the second symbol stream are derived from same information, the method further comprising:

selecting the first symbol stream for decoding, if a signal to interference ratio of the first symbol stream is greater than a signal to interference ratio of the second symbol stream.

9. The method of claim 1, wherein if the first symbol stream and the second symbol stream are derived from same information, the method further comprising:

selecting the first symbol stream for decoding, if a channel energy of the first symbol stream is greater than a channel energy of the second symbol stream.

10. The method of claim 1 further comprising:

decoding the first symbol stream;

decoding the second symbol stream; and if the first decoded symbol stream has an error and if the second decoded symbol stream has no error or at least meets a predetermined condition, then removing the second decoded symbol stream and decoding the first symbol stream again.

11. The method of claim 1, wherein the first symbol stream and the second symbol stream are derived from the same information.

12. A method for processing a plurality of symbol streams, the method comprising:

receiving a first symbol stream, wherein the first symbol stream has a corresponding first number of retransmissions; and receiving a second symbol stream, wherein the second symbol stream has a corresponding second number of retransmissions, wherein the first symbol stream and the second symbol stream have a corresponding decoding order related to a previous transmission and wherein if the first number of retransmissions is equal to the second number of retransmissions, the method further comprising:

selecting the first symbol stream or the second symbol stream for decoding based on the decoding order.

13. The method of claim 12, wherein if the first symbol stream and the second symbol stream are transmitted for the first time, the method further comprising:

selecting the first symbol stream for decoding, if a channel energy of the first symbol stream is greater than a channel energy of the second symbol stream.

14. The method of claim 12 further comprising decoding the selected symbol stream and using the selected symbol stream for interference cancellation, if the decoded symbol stream meets a predetermined condition.

15. The method of claim 14, wherein the predetermined condition relates to whether the decoded symbol stream has no error.

16. The method of claim 14, wherein the predetermined condition relates to whether the decoded symbol stream has a predetermined confidence level.

17. The method of claim 14, wherein the predetermined confidence level relates to an average of the log likelihood ratios of the decoded symbol stream.

18. The method of claim 12, wherein if the first symbol stream and the second symbol stream are derived from same information, the method further comprising:

selecting the first symbol stream for decoding, if a signal to interference ratio of the first symbol stream is greater than a signal to interference ratio of the second symbol stream.

19. The method of claim 12, wherein if the first symbol stream and the second symbol stream are derived from same information, the method further comprising:

selecting the first symbol stream for decoding, if a channel energy of the first symbol stream is greater than a channel energy of the second symbol stream.

20. The method of claim 12 further comprising:

decoding the first symbol stream;

decoding the second symbol stream; and if the first decoded symbol stream has an error and if the second decoded symbol stream has no error or at least meets a predetermined condition, then removing the second decoded symbol stream and decoding the first symbol stream again.

21. A method for processing a plurality of symbol streams, the method comprising:

receiving a first symbol stream, wherein the first symbol stream has a corresponding first number of retransmissions;

receiving a second symbol stream, wherein the second symbol stream has a corresponding second number of retransmissions;

selecting the first symbol stream for decoding, if the first number of retransmissions is greater than the second number of retransmissions, and wherein if the first number of retransmissions is equal to the second number of retransmissions, the method further comprising:

selecting the first symbol stream for decoding, if a channel energy of the first symbol stream is greater than a channel energy of the second symbol stream.

22. A method for processing a plurality of symbol streams, the method comprising:

receiving a first symbol stream, wherein the first symbol stream has a corresponding first number of retransmissions;

receiving a second symbol stream, wherein the second symbol stream has a corresponding second number of retransmissions;

selecting the first symbol stream for decoding, if the first number of retransmissions is greater than the second number of retransmissions, and wherein if the first number of retransmissions is equal to the second number of transmissions, the method further comprising:

decoding the selected symbol stream and using the selected symbol stream for interference cancellation, if the decoded symbol stream has a predetermined confidence level.

* * * * *